June 12, 1923.

L. S. CLARK

REPAIR LINK

Filed June 30, 1922

1,458,571

Lester S. Clark
Inventor

By Frank B. Wooden.
Attorney

Patented June 12, 1923.

1,458,571

UNITED STATES PATENT OFFICE.

LESTER S. CLARK, OF REISTERSTOWN, MARYLAND.

REPAIR LINK.

Application filed June 30, 1922. Serial No. 572,074.

*To all whom it may concern:*

Be it known that I, LESTER S. CLARK, a citizen of the United States, residing at Reisterstown, county of Baltimore, and State of Maryland, have invented a new and useful Repair Link, of which the following is a specification.

This invention relates to repair links for chains and has for its object the provision of a strong link, simply constructed, it being particularly designed for use in repairing the tread chains of automobile anti-skid chains.

Another object is to provide a repair link that may be easily applied to a broken chain and that will conform readily to the contour of the tire to which the chain may be applied.

With these and other objects in view the invention aims to improve generally and to enhance the utility of devices of that class to which the present disclosure relates.

Figure 1:
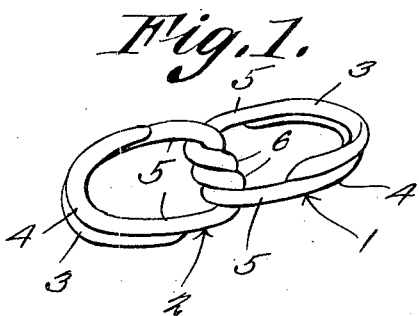

In the drawing Figure 1 is a perspective view of the device.

Figure 2:
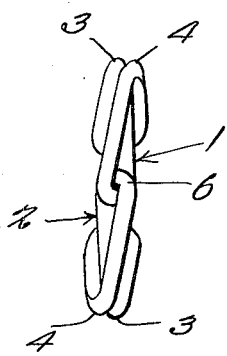

Figure 2 is an edge view of the same.

Referring to the drawing it will be seen the link comprises two members 1 and 2, they being similar in construction, each having loop shaped members 3 and 4 oppositely disposed and having their outer ends overlapped. The shanks 5 of the loops have their inner ends connected by a transversely extended spiral twist 6, the twist of one member engaging the twist of the other member to form a pivotal connection between the said members. By reason of the pivotal connection the link will adapt itself to the curvature of an automobile tire when used in the cross-chain of non-skid chains. Also when used to repair chains intended to pass over a shieve the link will conform to the shape of the shieve or pulley in passing over the same.

In using the link it will be necessary to insert some sharp instrument between the loops 3 and 4 and pry the same apart for the insertion of the chain being repaired, the spiral twist 6 provides sufficient resiliency for this purpose and causes the loop to return to closed position after the link is inserted.

A repair link constructed in accordance with the present invention is particularly adapted for the purpose intended and may be very cheaply manufactured.

Minor changes may be made in the device within the scope of what is claimed without departing from the spirit of the inventon.

Having thus described the invention what is claimed is:

1. A device of the class described comprising a pair of members each including loop shaped parts, oppositely disposed and an intermediate twisted portion affording a resilient connection between the said parts to permit access to the parts.

2. A device of the class described comprising loop shaped members including inturned portions which are twisted together to afford a hinge joint between said members, each of said members embodying resilient parts affording access to said members the said parts of each member remaining in fixed relation to each other when relative movement between the said members occurs at the hinge joint.

LESTER S. CLARK.